(12) United States Patent
Rentschler

(10) Patent No.: US 9,398,495 B2
(45) Date of Patent: Jul. 19, 2016

(54) COMPLETELY REDUNDANT CONNECTION AND HANDOVER IN CELLULAR INDUSTRIAL RADIO NETWORKS

(75) Inventor: Markus Rentschler, Dettingen (DE)

(73) Assignee: HIRSCHMANN AUTOMATION AND CONTROL GMBH, Neckartenzlingen (DE)

( * ) Notice: Subject to any disclaimer, the term of this patent is extended or adjusted under 35 U.S.C. 154(b) by 94 days.

(21) Appl. No.: 14/120,000

(22) PCT Filed: Jun. 6, 2012

(86) PCT No.: PCT/EP2012/060633
§ 371 (c)(1),
(2), (4) Date: Dec. 9, 2013

(87) PCT Pub. No.: WO2012/168262
PCT Pub. Date: Dec. 13, 2012

(65) Prior Publication Data
US 2014/0092872 A1   Apr. 3, 2014

(30) Foreign Application Priority Data

Jun. 10, 2011   (DE) .......................... 10 2011 105 236

(51) Int. Cl.
*H04W 24/04* (2009.01)
*H04W 36/00* (2009.01)
*H04W 92/12* (2009.01)
(Continued)

(52) U.S. Cl.
CPC ............. *H04W 36/0011* (2013.01); *H04L 1/22* (2013.01); *H04L 69/14* (2013.01); *H04L 69/40* (2013.01); *H04W 24/04* (2013.01); *H04L 67/12* (2013.01); *H04W 36/026* (2013.01);
(Continued)

(58) Field of Classification Search
CPC ..... H04L 29/06; H04L 63/08; H04L 63/0853; H04L 67/04; H04L 67/14; H04L 69/329; H04W 12/06; H04W 84/042; H04W 88/08; H04W 92/02
See application file for complete search history.

(56) References Cited

U.S. PATENT DOCUMENTS 5,329,521 A   7/1994 Walsh
5,546,397 A   8/1996 Mahany
(Continued)

FOREIGN PATENT DOCUMENTS

DE   102009053868 A   6/2010
WO      2010057655 A   7/2010

*Primary Examiner* — Ayaz Sheikh
*Assistant Examiner* — Debebe Asefa
(74) *Attorney, Agent, or Firm* — Foley & Lardner LLP

(57) ABSTRACT

Apparatus for securely transmitting data between a mobile subscriber (1) having at least one transmission apparatus (2) and a stationary receiver (3), wherein the mobile subscriber (1) can change between a plurality of radio cells (Cell 1, Cell 2, Cell 3) and each radio cell (Cell 1, Cell 2, Cell 3) has at least one transmission apparatus (AP1, AP2, AP3), wherein the at least one transmission apparatus (AP1 to AP3) is also connected in a wired manner to at least one network (LAN A, LAN B), wherein the stationary receiver (3) is likewise connected in a wired manner to the at least one network (LAN A, LAN B), and both the wireless transmission between the mobile subscriber (1) and the transmission apparatus (AP1 to AP3) respectively associated with the latter and the wired data transmission between the transmission apparatus (AP1 to AP3) and the at least one associated network (LAN A, LAN B) are carried out redundantly, and the stationary receiver (3) is redundantly connected in a wired manner to the network (LAN A, LAN B).

10 Claims, 4 Drawing Sheets

Figure 1:
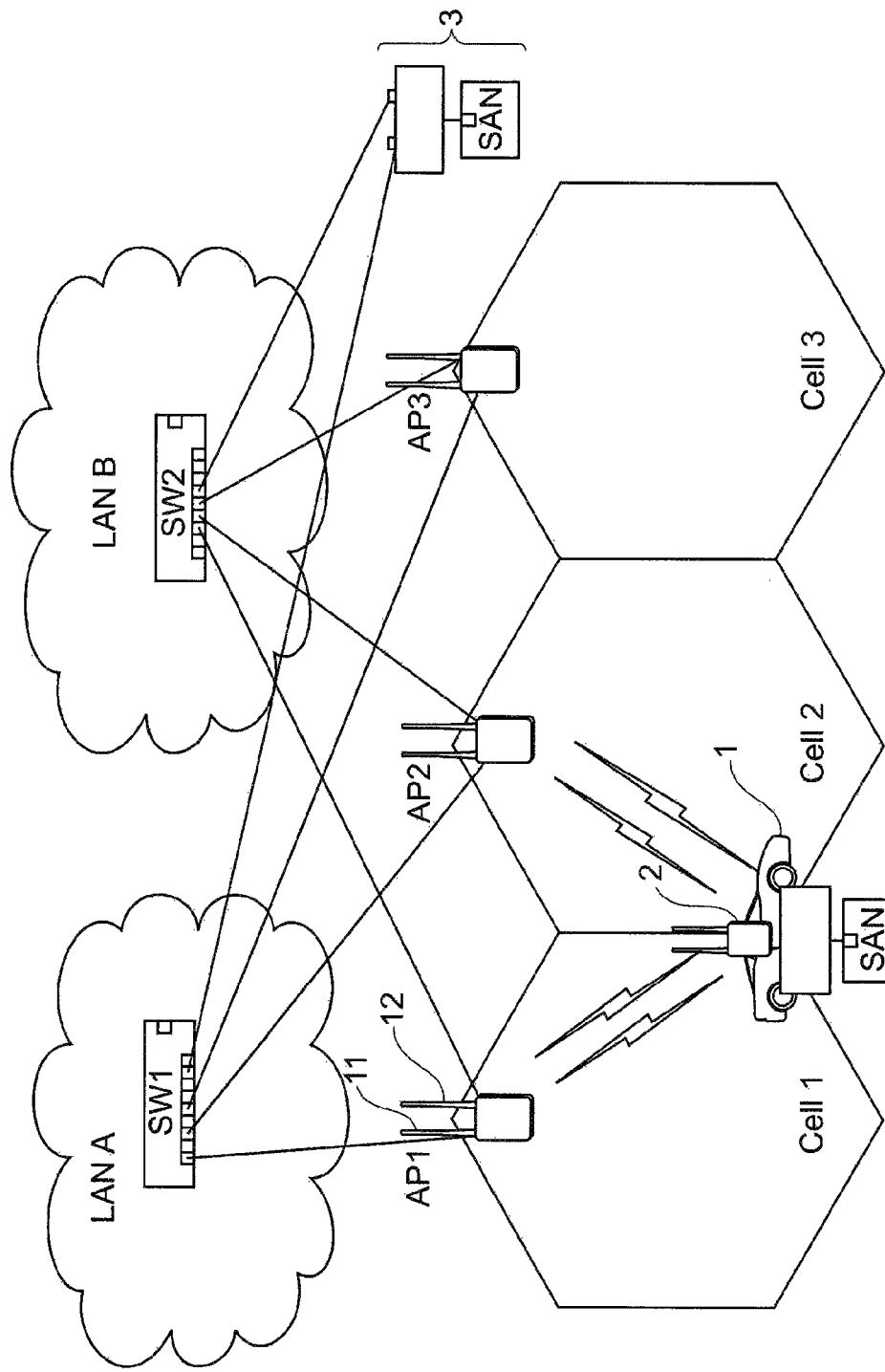

(51) Int. Cl.
  *H04W 92/14*  (2009.01)
  *H04L 29/08*  (2006.01)
  *H04L 29/14*  (2006.01)
  *H04L 29/06*  (2006.01)
  *H04L 1/00*   (2006.01)
  *H04L 1/22*   (2006.01)
  *H04W 36/02*  (2009.01)
  *H04W 76/02*  (2009.01)

(52) U.S. Cl.
  CPC ............ *H04W 76/025* (2013.01); *H04W 92/12* (2013.01); *H04W 92/14* (2013.01)

(56) References Cited

U.S. PATENT DOCUMENTS

| | | |
|---|---|---|
| 5,586,170 A | 12/1996 | Lea |
| 5,781,530 A | 7/1998 | Segal |
| 8,086,855 B2 * | 12/2011 | Katz et al. .................... 713/170 |
| 8,693,316 B2 * | 4/2014 | Palanki et al. ............... 370/225 |
| 8,731,550 B2 * | 5/2014 | Radulescu et al. ........... 455/434 |
| 8,787,309 B1 * | 7/2014 | Bharghavan et al. ......... 370/331 |

* cited by examiner

COMPLETELY REDUNDANT CONNECTION AND HANDOVER IN CELLULAR INDUSTRIAL RADIO NETWORKS

CROSS REFERENCE TO RELATED APPLICATIONS

This application is the U.S. national stage of PCT application PCT/EP2012/060633 filed 6 Jun. 2012 and claiming the priority of German patent application 102011105236.8 itself filed 10 Jun. 2011.

The invention relates to a system and a method of providing reliable data transmission between a mobile user and a stationary receiver as set forth in the features of the preamble of the independent claims.

The ensured reliable transmission of data discussed here relates to a mobile user designed to maintain contact with a stationary receiver where the radius of movement for the mobile user can be of such dimension that a single radio cell having only one access point is not sufficient to provide wireless data transmission between the mobile user and the stationary receiver. The invention thus relates to the transmission of data where the mobile user switches from one radio cell to the next when the user moves. Maintaining this data connection between the mobile user and the stationary receiver as radio cells are switched requires a connection transfer or handover, which term refers to a procedure within a mobile telecommunications network in which the mobile terminal in motion switches from one radio cell to another during a conversation or data connection without interruption of this connection. With a "hard handover" the existing connection to the current radio cell is ended completely before the connection to another new radio cell is established. This procedure is employed, for example, in GSM networks. The procedure identified as a "soft handover" is one in which the connection is established to the new radio cell before the existing connection is ended. As a result, two connections exist simultaneously for a certain period of time between the mobile user and the two different radio cells. This method is used, for example, in UMTS and is also the fundamental approach for the invention described here.

With these two methods, however, the fact that the connection during the handover from one radio cell to the next is not effected at all, is delayed, or is faulty does not play any fundamental, in particular, safety-critical role. The user notices this type of defect, for example, when the voice connection (phone call) or data connection (access to the Internet, for example) is dropped completely, is interrupted temporarily, or is difficult to understand (speech), or intermittent (data). Although these various defects during the handover from one radio cell to another radio cell may be perceived as inconvenient by the mobile user, this aspect does not entail any safety-relevant consequences.

Such transmission links do exist, however, between a mobile user and a stationary receiver where the mobile user is moving from radio cell to radio cell while at the same time the transmission of data must be reliably ensured. This means that either no errors are allowable, or such errors are allowable only below a very low tolerance threshold, both during the data transmission itself and also during the handover from one radio cell to another radio cell. This invention in fact relates only to those systems and methods for providing ensured reliable data transmission, and thus these cannot be compared with the above-described data transmission methods for voice and, for example, the Internet.

This type of reliable data transmission is mentioned, for example in DE 10 2009 053 868. This prior art, however, relates only to a network comprising controller and sensor/actuator comprising two redundant transmission links, where the controller is connected to the sensor or the actuator through two separate wireless transmission links and data transmission between the controller and the sensor or actuator is effected through both transmission links that have different transmission parameters or different transmission techniques. There is no mention here that either the controller, the sensor, or the actuator are mobile users, and therefore the above-described handover is not addressed at all in this prior art.

The object of the invention is therefore to provide a system and a method of effecting reliable data transmission between a mobile user and a stationary receiver where reliable data transmission is also guaranteed during handover while at the same time the handover and/or reliable data transmission is implemented in a rapid and straightforward fashion in such a way that the overall system does not require excessive computer capacity.

This object is achieved by the features of the two independent claims.

The invention provides a system or a method of effecting reliable data transmission between a mobile user having a transmitter and a stationary receiver, wherein the mobile user can switch between multiple radio cells and each radio cell includes at least two transmitters, wherein furthermore the transmitters of the radio cells are each hard wired to a respective network, wherein the stationary receiver is also hard wired to the at least one network, and both the wireless transmission between the mobile user and its respective transmitter as well as the hard-wired data transmission between the data transmitter of the radio cell and the at least one respective network are effected redundantly, wherein furthermore the stationary receiver is redundantly hard wired to the network.

The hard-wired link has the basic advantage that this approach enables the desired reliable, that is, error-free or virtually error-free transmission of data to be implemented without difficulty. This approach is not only known in the prior art but is also recognized as a way of effecting the reliable transmission of data. In order, however, to further enhance reliable data transmission, the hard-wired transmission link is also implemented redundantly, such that at least one transmission link is always available in the event one of the two transmission links fails.

Transmission of each data packet here is effected in duplicated fashion through both transmission links, thereby ensuring that the packet will reach the receiver through the other link in the event one link fails. A method of this type is described in IEC 62439-3 as a "Parallel Redundancy Protocol."

The invention provides a further advantage by implementing more than one, and thus redundant, wireless data transmission link, in particular, a radio link between the mobile user and the radio cell. This means that reliable data transmission is guaranteed here too between the mobile user and the transmitter of the respective radio cell. This is because a wireless transmission link for data transmission is always available with sufficiently high probability even in the event one of the redundant transmission links is disturbed. This is especially critical particularly for data transmission by radio since a wide variety of interfering variables are present here (such as, for example, obstructing elements, reflections, interference, external interference signals, the effects of weather, effects of the environment, and the like). An additional factor, however, is that during the handover from one radio cell to the other radio cell at least one of the redundant transmission links in the one radio cell can be used until the handover of one of the other transmission links has been completed to the other radio cell. Since interruptions of the connection can occur in the transmission link involved in the handover process, interruption-free transmission of data is guaranteed during this period through the redundant link that is not involved in the handover. It is only after the handover of a redundant transmission link from one radio cell to the next radio cell has been effected without error that the data transmission of the other redundant transmission link can be terminated between the mobile user and the transmitter of the previous radio cell, and that the handover can also be effected for this transmission. The additional advantage provided is that then one of the two transmission links of the one radio cell and one of the two transmission links of the other radio cell can be used for reliable data transmission.

In a development of the invention, the wireless transmission in the method of providing reliable data transmission is effected through the respective redundant radio link using any desired method of wireless data transmission, preferably, the IEEE 802.11 standard (W-LAN or WiFi), either with the same or different transmission parameters for each radio link. Possible different transmission parameters include, for example, the frequencies (in particular, 2.4 and 5 GHz), the type of modulation, the combination of data packets, or the like.

In a development of the invention, the data transmission is always effected in parallel redundant fashion through both transmission links (that is, the redundant radio transmission links and/or the redundant hard-wired transmission links), the same or the repeat data transmission being blockable on the other transmission link when it is determined that the data transmission has been completed without error over one transmission link (hard-wired and/or wireless). This means, for example, that the broadcast of data is acknowledged by the respective receiver, thereby enabling the transmitter to know that the data transmission has been completed in a reliable and error-free fashion (or below a predefined tolerance threshold). This then effectively prevents additional data, in particular, duplicate data, from being broadcast, thus conserving the computing capacity of the overall system. A particular advantage here is the fact that the blocking action is effected within a radio cell and/or when switching the mobile user between two radio cells. If the blocking action is effected only within one radio cell, this provides the advantage that the cell's transmission and computing capacities, that is the physical and hardware-related functions, can be utilized more efficiently by preventing unnecessary duplicated data from being sent over the redundant wireless transmission links. Combining the two above-referenced possible approaches is an especially optimal factor since the cost of reliable data transmission can thus be completed in an reliable fashion, that is, error-free, both during the data transmission wirelessly between the mobile user and the network, then from there in hard-wired fashion to the stationary receiver. This is true, of course, whenever the mobile user switches from one radio cell to another radio cell.

In a development of the invention, provision is made whereby control of the blocking action for unnecessary data transmissions, in particular preventing the generation and transmission of duplicated data, is implemented by a central control unit. This means that this central control unit monitors both the devices within the individual radio cells and also within the individual networks, and can access them. Alternatively, provision is made in a development of the invention whereby control is implemented by one control unit each that is integrated in a respective transmitter. A possible approach here is one whereby the respective control units that are integrated in each transmitter within the radio cell or the network, and are thus decentralized, are also monitored or controlled centrally by a cross-network control unit.

The invention is described below in more detail based on illustrated embodiments, to which the invention is nevertheless not restricted, and is shown in the figures.

FIG. 1 shows, as do the remaining figures, a complete network to which the system according to the invention and the method according to the invention relate. FIG. 1 shows a mobile user 1 represented by a vehicle. The mobile user 1, however, is not limited to a vehicle but can be any moving object. A transmitter is contained within this mobile user 1 that is designed and intended to transmit signals wirelessly over an antenna, in particular by radio. The mobile user 1 is generally located exactly in a radio cell 1, but it is possible for the user to switch from the one radio cell 1 to another radio cell 2, and to other radio cells 3 through cell N (N>3). The transmitter 2 of the mobile user 1 always remains in radio contact with the transmitter AP1, AP2, AP3, etc. of the respective radio cell so as to thereby ensure the reliable transmission of data. Data transmission between the mobile user 1, or its transmitter 2 and the transmitters of the respective radio cells is effected through the transmitters AP1, AP2, AP3, etc. over redundant radio links. In order to enable data to be transmitted in a reliable manner from the mobile user 1 to a stationary receiver 3, the data sent or received through the transmitters AP1, AP2, AP3, etc. are relayed through hard-wired links to networks, preferably, LAN A and LAN B. The data sent by the mobile user 1 are transmitted to the stationary receiver 3, or data from the stationary receiver 3 are transmitted to the mobile user 1, through appropriate network infrastructure devices, here a switch SW1 in the network LAN A, and a second switch SW2 in the network LAN B. In the embodiment of FIG. 1, this ensures that a redundant connection, wireless and hard-wired, always exists between the mobile user 1 and the stationary receiver 3. This also applies when the mobile user 1 switches from one radio cell to another radio cell. This means that the data are transmitted between receivers 2 and AP1 whenever the mobile user 1 is only located in a single cell (for example, cell 1). If the mobile user 1 is located, for example, only within the effective range of radio cell 3, reliable data transmission is effected between the transmitter 2 and transmitter AP3 of radio cell 3. The embodiment of FIG. 1 illustrates that the mobile user 1 is just in the process of moving from radio cell 1 to radio cell 2. In this case the following scenario is possible. Reliable data transmission is effected redundantly from the transmitter 2 to transmitter AP1 or vice versa. Alternatively, reliable data transmission is effected between the transmitter 2 and transmitter AP2 of radio cell 2. Alternatively or additionally, reliable data transmission can also be effected through one of the two redundant transmission links between the transmitter 2 and transmitter AP1 of radio cell 1, as well as through one of the two redundant transmission links between the transmitter 2 and transmitter AP2 of radio cell 2. Since both transmitters AP1 and AP2 are redundantly hard wired to both mutually independently operating networks LAN A and LAN B, the entire data transmission between the mobile user 1 and the stationary receiver 3 is always effected redundantly, in particular, also including during a handover.

Figure 2:
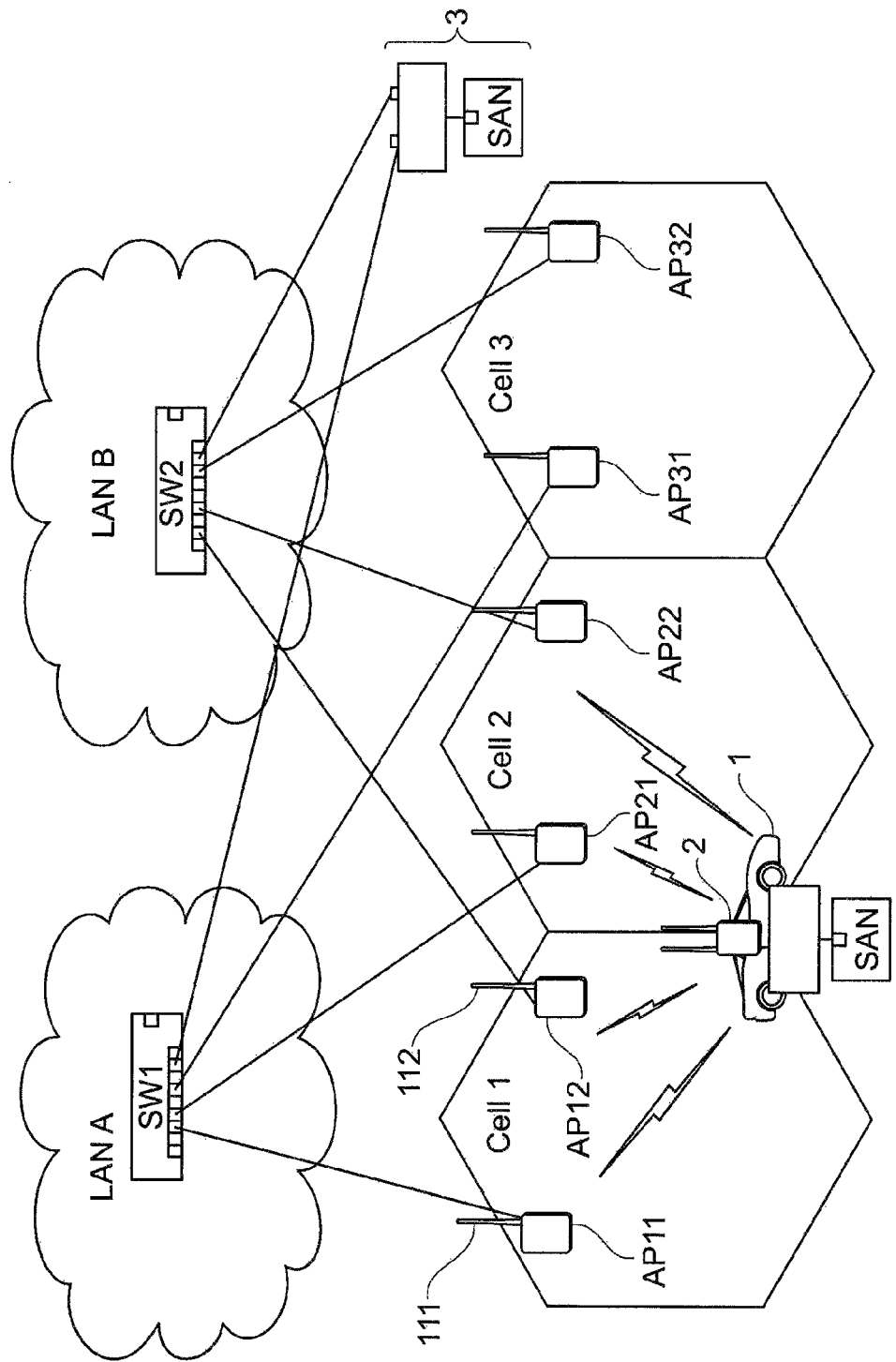

Whereas FIG. 1 shows that the transmitters AP1, AP2, AP3, etc. each have two antennas (represented by 11, 12 for AP1) per radio cell 1, 2, 3, etc., FIG. 2 shows that two separate transmitters AP11/AP12, AP21/AP22, AP31/AP32, etc. are each provided with one antenna (here represented by 111, 112 for AP11) per radio cell 1, etc.. This applies for the transmitter 2 of the mobile user 1 for the embodiments in the figures, although this is not shown. The transmitter 2 too can be a single device having two antennas (as shown), although it is alternatively also possible for the transmitter 2 to be configured as two separate devices each having its own antenna. Very good redundant and reliable transmission of data is advantageously achieved by these two above-described variants. The effort and complexity of control required for this purpose resulting from the appropriate control units (not shown) can also be considered the best possible approach in terms of rapidity of switching between two redundant transmission links, performance, and also cost. Furthermore, the possible approach cannot be excluded that even more than two redundant transmission links (i.e. three, four, or even more) and respective transmitters are provided, as well as the corresponding number of radio links and hard-wired links.

Figure 3:
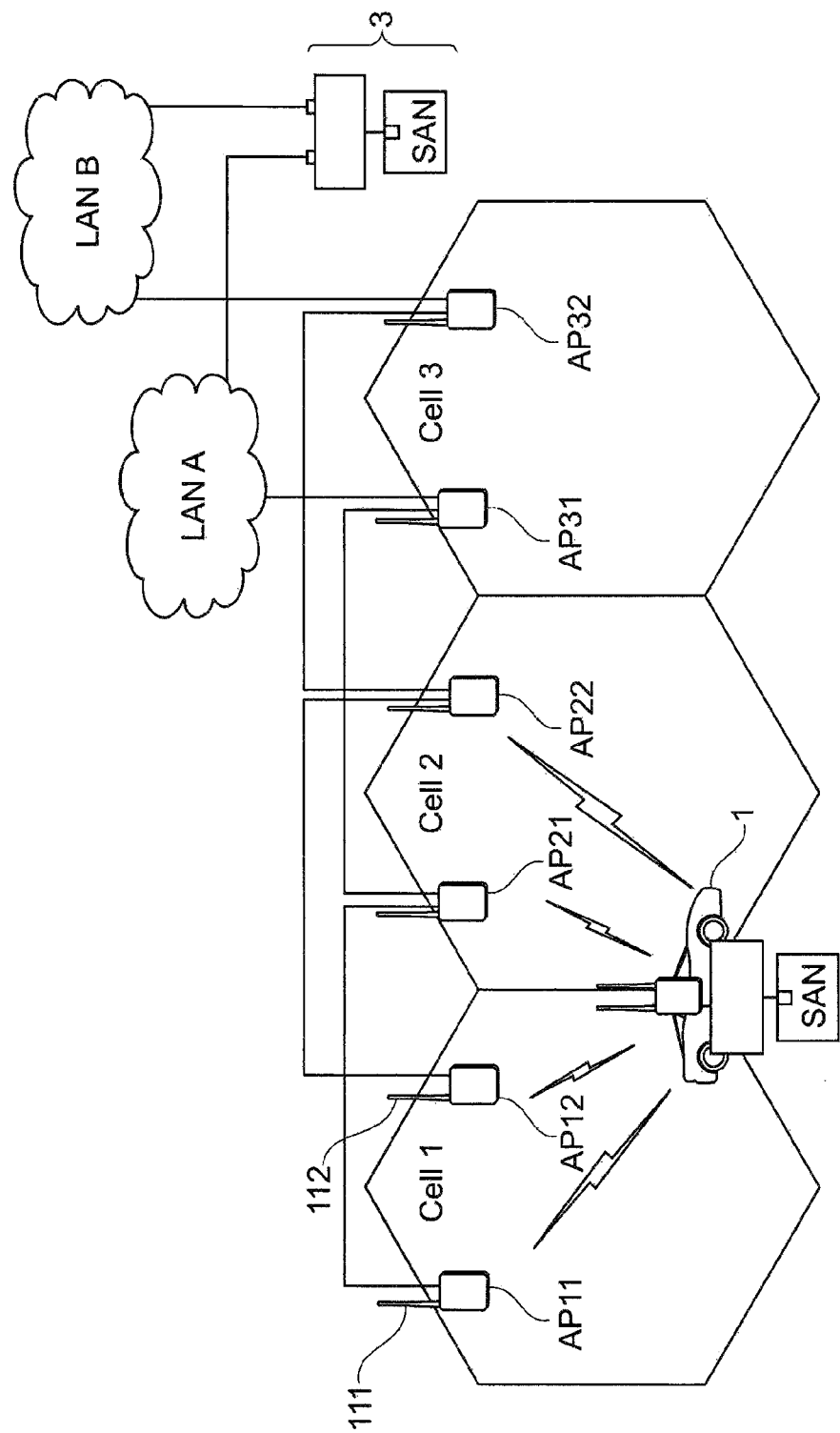

FIG. 3 shows the variant where one transmitter of one radio cell each is hard wired to each other, and one of the transmitters is connected to the respective network. A possible example here would be the transmission chain AP11/AP21/AP31/LAN A, and AP12/AP22/AP 32/LAN B as the redundant transmission link. It should be noted here that the illustration including exactly three radio cells, cell 1 through cell 3, is only an example, whereas the number of radio cells in practical situations will be significantly greater than this.

Figure 4:
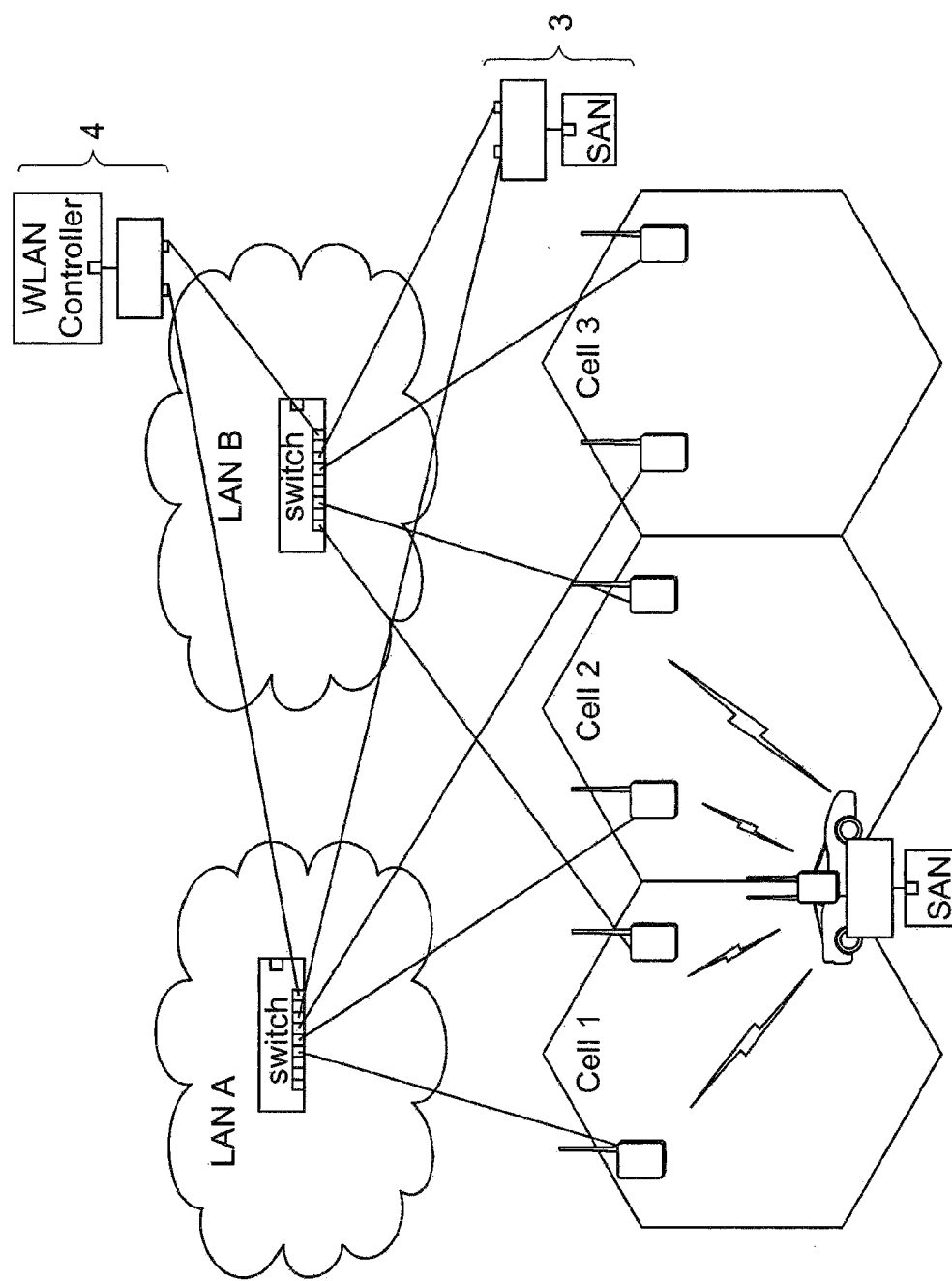

FIG. 4 is based on the embodiment of FIG. 2, although it could also be based on the embodiment of FIG. 1. This illustrates that control of the redundant data transmission and of the handover is implemented by a central control unit 4. This central control unit controls with or without feedback reliable data transmission from the mobile user 1 to the stationary receiver 3, and/or vice versa. In an alternative or additional possible approach, control is implemented by one control unit (not shown) each that is integrated in a respective transmitter. In an alternative or additional possible approach, separate independent control units for the redundant data transmission and handover are integrated in one network each (LAN A, LAN B, and subsequent possible networks) and also in the respective radio cells (cell 1, cell 2, cell 3, etc.). It is especially advantageous in terms of implementing the hardware if these control functions for the redundant data transmission or the handover are integrated in the transmitters (AP1, AP11, etc.) of the respective radio cells.

In the embodiments of FIGS. 1 through 4, the mobile user 1 and/or the stationary receiver 3 and/or central control unit 4 include a "redbox." This redbox, also called a redundancy box, is a device for connecting the SAN (single attached node), also shown. This means that the SAN is a conventional network node having only one network connection. Both in terms of the interconnection and also control, the redbox now makes it possible to connect this conventional node with only one network connection to a network (here, for example, LAN A and LAN B) that has redundancy properties. That means that the redbox manages the data transmission—in particular, in terms of the redundant data transmission—between the conventional node with only the one network connection and the two redundant networks connected thereto. This obviously also applies for the redbox and the SAN of the mobile user 1. The SAN in the embodiments of FIGS. 1 through 4 represents only one node, although multiple nodes can also be present. Additional network devices, not shown here, are understood to be provided at these nodes, such as, for example, PCs, connections to other networks, sensors, actuators, and the like. This means that, for example, even the mobile user 1 and/or the stationary receiver 3 are also not the "terminal station" for data transmission; instead, other additional devices, other networks, or the like can be connected there as well.

In an especially advantageous approach, wireless transmission is effected through the respective redundant radio links using the IEEE 802.11 standard. A reliable smooth handover of mobile users (mobile W-LAN clients) was previously not possible in the prior art based on this standard since a W-LAN connection is subject to interfering effects that result in sporadic, that is, indeterminable packet losses during data transmission. The standard W-LAN based on 802.11 is not suitable, or is of only limited suitability, specifically for reliable data transmission (so-called safety environment) since applications involving a high cycle rate and safety-relevant aspects (for example, hazards to people or equipment) require a packet loss rate in practical use that is equal to or close to zero.

The application considered for this reliable data transmission is, for example, heavy machinery, industrial vehicles (such as, for example, cranes), but also methods or production-equipment-related facilities that depend on error-free data transmission for their control, since safety-relevant aspects would otherwise play a disadvantageous role if the data transmission is not error-free.

The invention claimed is:

1. A system for providing reliable data transmission, comprising:
 a stationary receiver comprising:
  a first hard-wired connection to a first network, the first network connected to a first access point of a radio cell, the first hard-wired connection configured to communicate to a device of a mobile user via a first wireless transmitter of the first access point;
  a second hard-wired connection to a second network, the second network separate from the first network and also connected to the first access point of the radio cell, the second hard-wired connection configured to communicate to the device of the mobile user via a second wireless transmitter of the first access point;
  a third hard-wired connection to a third network; and
  a redundancy box configured to selectively couple communications via the third hard-wired connection to one of the first hard-wired connection and second hard-wired connection.

2. The system according to claim 1, wherein the third network comprises at least one SAN.

3. A redundancy device for providing reliable data transmission, comprising:
 a first wired connection coupled to a first network, in communication with a first network interface of a stationary receiver in communication with a mobile user via a first transmitter;
 a second wired connection coupled to a second network, in communication with a second network interface of the stationary receiver in communication with the mobile user via a second transmitter;
 a third wired connection coupled to a third network, retransmitting data received by one of the first wired connection and second wired connection; and
 a control unit blocking transmission of data received on the first wired connection via the third wired connection, responsive to successful transmission of the same data received on the second wired connection via the third wired connection.

4. The redundancy device of claim 3, wherein the first wired connection is further in communication, via the first network, with a first network interface of a second stationary receiver; and wherein the second wired connection is further in communication, via the second network, with a second network interface of the second stationary receiver.

5. The redundancy device of claim 3,
wherein the first wired connection is further in communication, via the first network, with a second device comprising a control unit;
wherein the second wired connection is further in communication, via the second network, with the second device; and
wherein the third wired connection is configured to block transmission of data received on the first wired connection via the third wired connection, responsive to successful transmission of the same data received on the second wired connection via the third wired connection, under control of the control unit of the second device.

6. A method for communicating via redundant links, comprising:
receiving, by a redundancy box, a first copy of a communication of a mobile device received by a first wireless receiver of a first radio cell and transmitted via a first hard-wired network to the redundancy box;
receiving, by the redundancy box, a second copy of the communication of the mobile device received by a second wireless receiver of the first radio cell and transmitted via a second hard-wired network to the redundancy box; and
selectively retransmitting, by the redundancy box, either the first copy or the second copy via a third hard-wired network.

7. The method of claim 6, wherein retransmitting the second copy via the third hard-wired network is performed responsive to unsuccessful retransmission of the first copy via the third hard-wired network.

8. The method of claim 6, further comprising:
receiving, by the redundancy box, a second communication via the third hard-wired network; and
retransmitting, by the redundancy box, the second communication via both the first hard-wired network and the second hard-wired network.

9. The method of claim 8, wherein retransmitting the second communication via both the first hard-wired network and the second hard-wired network further comprises:
retransmitting the second communication via the first hard-wired network for transmission by a first wireless transmitter of the first radio cell to the mobile device of the user; and
retransmitting the second communication via the second hard-wired network for transmission by a second wireless transmitter of the first radio cell to the mobile device of the user.

10. The method of claim 9, wherein the first wireless transmitter and second wireless transmitter have different transmission parameters.

* * * * *